(12) United States Patent
Sumoto et al.

(10) Patent No.: US 12,036,904 B2
(45) Date of Patent: Jul. 16, 2024

(54) SEAT

(71) Applicant: DELTA KOGYO CO., LTD., Hiroshima (JP)

(72) Inventors: Katsumi Sumoto, Hiroshima (JP); Daiki Inoue, Hiroshima (JP); Yuji Sato, Hiroshima (JP); Masashi Mukai, Hiroshima (JP)

(73) Assignee: DELTA KOGYO CO., LTD., Hiroshima (JP)

( * ) Notice: Subject to any disclaimer, the term of this patent is extended or adjusted under 35 U.S.C. 154(b) by 198 days.

(21) Appl. No.: 17/602,016

(22) PCT Filed: Jun. 2, 2020

(86) PCT No.: PCT/JP2020/021842
§ 371 (c)(1),
(2) Date: Oct. 7, 2021

(87) PCT Pub. No.: WO2020/255705
PCT Pub. Date: Dec. 24, 2020

(65) Prior Publication Data
US 2022/0153172 A1    May 19, 2022

(30) Foreign Application Priority Data

Jun. 17, 2019 (JP) .................................. 2019-111908

(51) Int. Cl.
*B60N 2/60* (2006.01)
(52) U.S. Cl.
CPC .................... *B60N 2/6018* (2013.01)

(58) Field of Classification Search
CPC ................................................... B60N 2/6018
See application file for complete search history.

(56) References Cited

U.S. PATENT DOCUMENTS

2016/0375806 A1    12/2016    Etienne et al.
2017/0305316 A1    10/2017    Lafferty et al.

FOREIGN PATENT DOCUMENTS

| DE | 10 2017 211920 A1 | 2/2018 |
|---|---|---|
| EP | 2393690 B1 | 5/2013 |
| FR | 3 037 879 A1 | 12/2016 |
| JP | H06-059151 U | 8/1994 |

(Continued)

OTHER PUBLICATIONS

International Search Report issued in PCT/JP2020/021842; mailed Sep. 1, 2020.

(Continued)

*Primary Examiner* — Anthony D Barfield
(74) *Attorney, Agent, or Firm* — Studebaker & Brackett PC

(57) ABSTRACT

Provided is a seat having an improved appearance by hiding a section where a trim cover is attached to a backboard from an outside. A seat includes: a seat pad; a backboard disposed on a back surface of the seat pad; a trim cover covering a front surface of the seat pad; a terminal member attached to the trim cover along an end thereof, and a connection member attached to an end of the backboard for connecting the terminal member thereto. The terminal member is connected to the connection member in a state where the terminal member and the connection member are covered with the trim cover from an outside, so that the end of the trim cover is fastened to the end of the backboard.

12 Claims, 15 Drawing Sheets

(56) References Cited

FOREIGN PATENT DOCUMENTS

| JP | 2007-037703 A | 2/2007 |
|----|---------------|--------|
| JP | 2013-151238 A | 8/2013 |
| WO | 2016/040734 A1 | 3/2016 |

OTHER PUBLICATIONS

The extended European search report issued by the European Patent Office on Mar. 24, 2022, which corresponds to European Patent Application No. 20825866.5-1012 and is related to U.S. Appl. No. 17/602,016.

SEAT

TECHNICAL FIELD

The present invention relates to a seat including a trim cover fixedly attached to a backboard on a back surface of the seat.

BACKGROUND ART

Seats for vehicles, like a seat disclosed in Patent Literature 1, have conventionally been known to have a structure where a seatback for supporting the back of a seated person includes: a seat pad; a trim cover covering a front surface and side surfaces of the seat pad; and a backboard covering a back surface of the seat pad, wherein the trim cover is fixedly attached to the backboard.

In the seat disclosed in Patent Literature 1, a zipper is sewn to an end of the trim cover and an end of the backboard to connect these ends to each other.

In the seat disclosed in Patent Literature 1, the zipper is used to connect the end of the trim cover and the end of the backboard to each other. In this configuration, the zipper is seen from an outside of the seat in an attached state of the trim cover where the zipper is closed. Therefore, it is difficult to improve the appearance of the seat. Furthermore, the zipper is required to be closed from the outside of the trim cover in an operation of attaching the trim cover. This faces difficulty in arranging the zipper at an invisible position from the structural perspective.

CITATION LIST

Patent Literature

Patent Literature 1: European Patent Publication No. 2393690

SUMMARY OF INVENTION

An object of the present invention is to provide a seat having an improved appearance by hiding a section where a trim cover is attached to a backboard from an outside.

To achieve the aforementioned object, the seat of the present invention includes: a seat pad having a front surface and a back surface; a backboard disposed on the back surface of the seat pad; a trim cover covering the front surface of the seat pad; a terminal member attached to the trim cover along an end of the trim cover; and a connection member attached to an end of the backboard for connecting the terminal member thereto. The terminal member is connected to the connection member in a state where the terminal member and the connection member are covered with the trim cover from an outside, so that the end of the trim cover is fastened to the end of the backboard.

BRIEF DESCRIPTION OF DRAWINGS

FIG. 4A shows a state of the terminal member to be attached to the trim cover, and FIG. 4B shows a state of the terminal member having been attached to the trim cover in a bent form along an end of the trim cover;

FIG. 8A shows a state of the clip to be attached to the end of the backboard, and FIG. 8B is a cross-sectional view taken along the line A-A in FIG. 8A;

FIG. 9A shows a state of the clip having been attached to the end of the backboard, and FIG. 9B is a cross-sectional view taken along the line A-A in FIG. 9A;

DESCRIPTION OF EMBODIMENTS

Hereinafter, a preferable embodiment of the present invention will be described with reference to the accompanying drawings.

Figure 1:
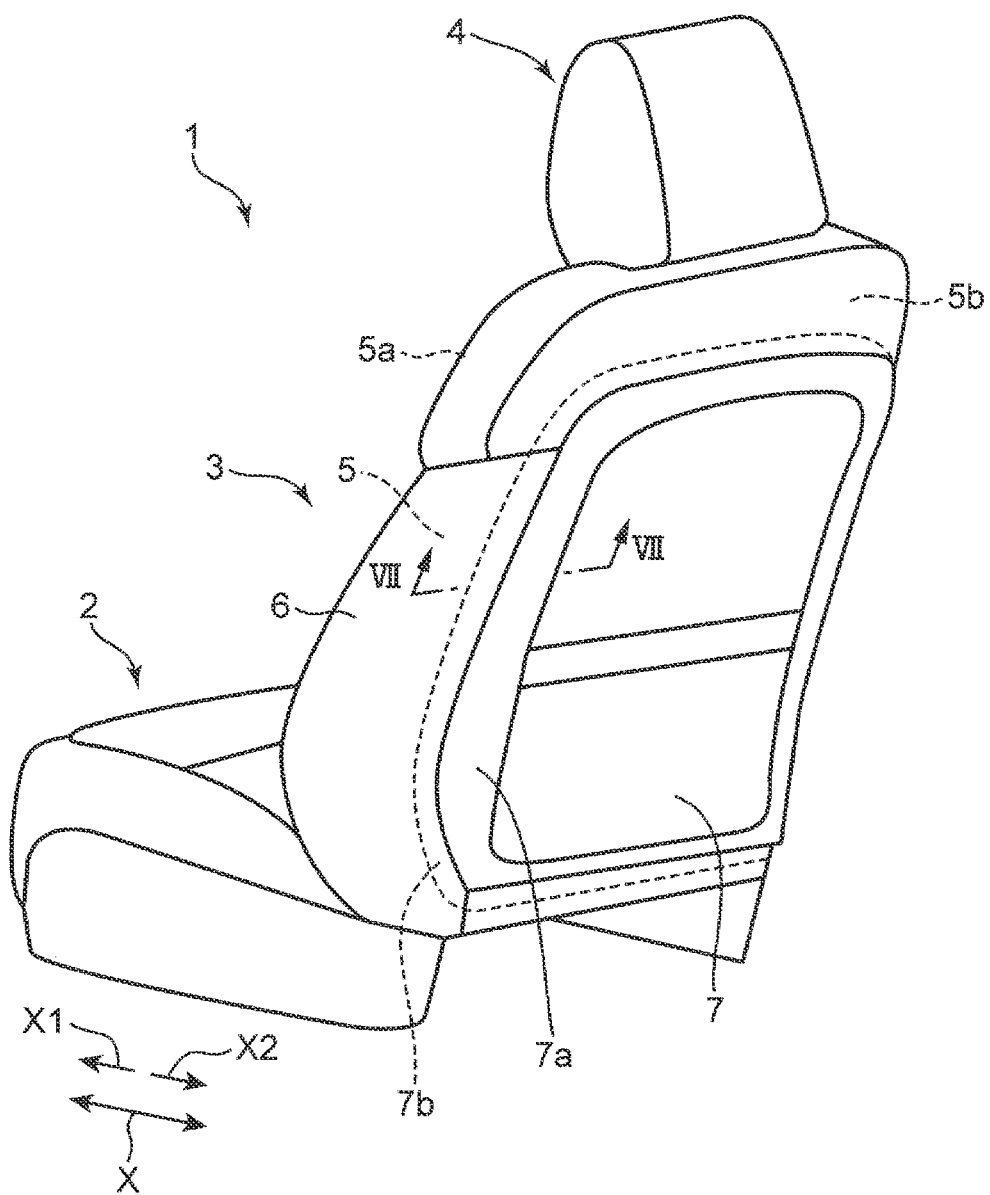
FIG. 1 is a perspective view showing an overall configuration of a seat according to an embodiment of the present invention.

A seat 1 for a vehicle according to an embodiment of the present invention is arranged to face the front X1 in a front-rear direction X of the vehicle as shown in FIG. 1. The seat 1 includes a seat cushion 2 for supporting the buttocks of a seated person, a seatback 3 for supporting the back of the seated person, and a headrest 4 for supporting the head of the seated person. The seatback 3 stands in the rear X2 of the seat cushion 2. The headrest 4 is provided on top of the seatback 3.

The seatback 3 illustrated in FIG. 1 includes a seat pad 5 made of a foam resin, a trim cover 6 covering at least a front surface 5a (a front surface 5a, side surfaces, and a top surface in the embodiment) of the seat pad 5, and a backboard 7 disposed on a back surface 5b of the seat pad 5.

Figure 2:
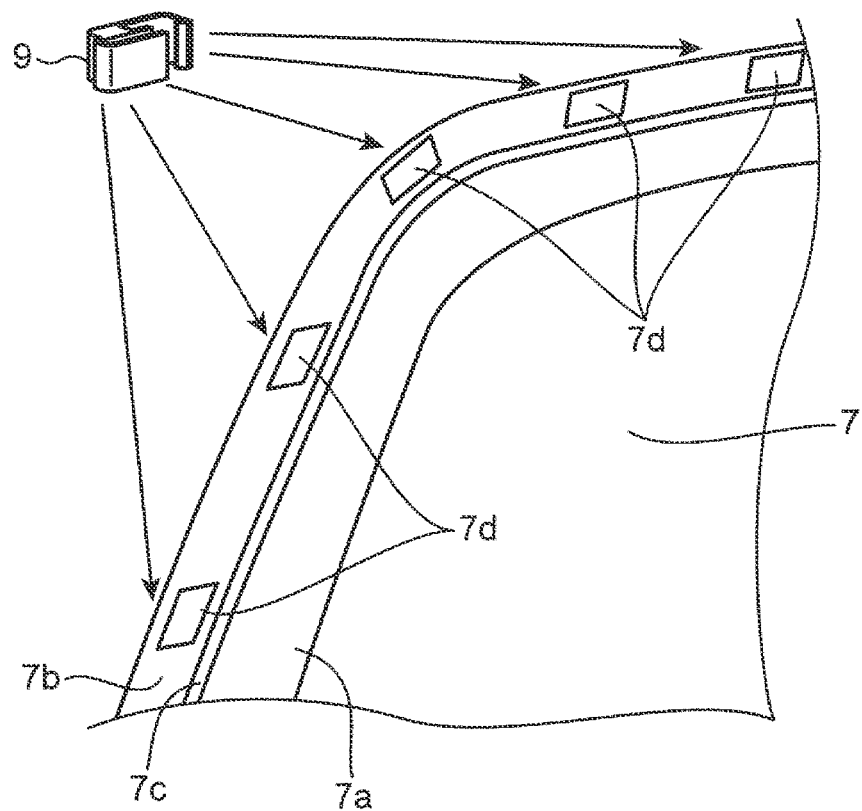
FIG. 2 is a perspective view of a main portion of a backboard enlarged to show an end and an opening of the backboard in FIG. 1, and a clip to be inserted in the opening.

The backboard 7 is a plate-like member disposed on the back surface 5b of the seat pad 5 as shown in FIGS. 1 to 2. The backboard 7 is made of a soft material, such as a synthetic resin, and thus is easily deformable. Particularly, an end 7b thereof is easily deformable.

Figure 7:
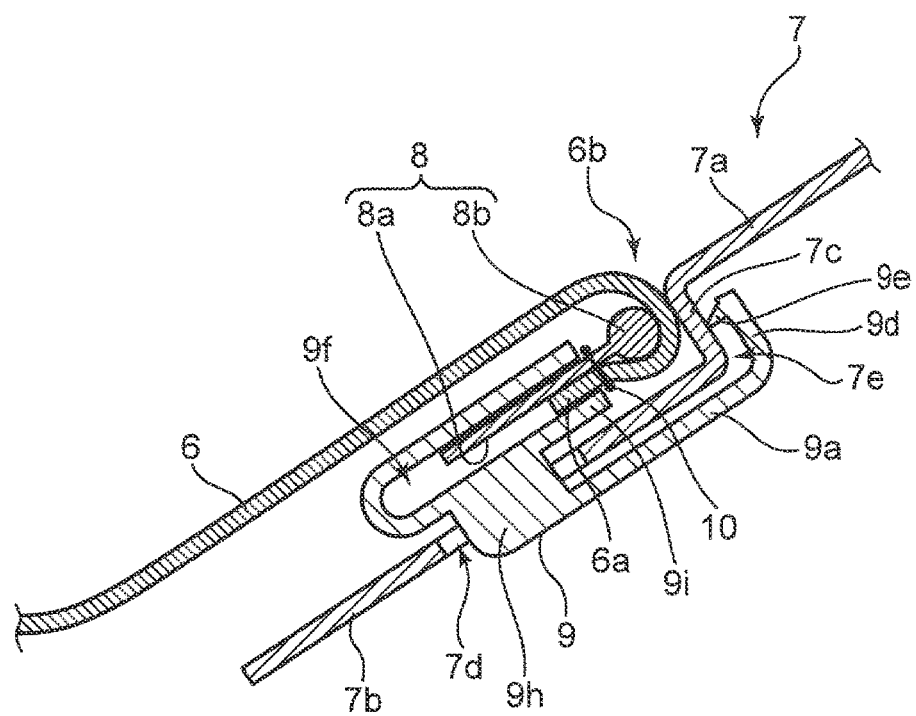
FIG. 7 is a cross-sectional view taken along the line VII-VII in FIG. 1.

Specifically, the backboard 7 has a main body 7a having a substantially rectangular shape, the end 7b having a loop shape along an outer periphery of the main body 7a, and a step 7c defined between the end 7b and the main body 7a of the backboard 7 (see FIG. 7). The end 7b protrudes from an outer peripheral surface of the main body 7a in a direction away from the outer peripheral surface.

As shown in FIG. 2 and FIG. 7, the end 7b of the backboard 7 has a plurality of openings 7d each having a rectangular shape for receiving a board-side engagement part 9a (see FIG. 5 and FIG. 7) of a clip 9, which will be described later, insertable therein. The openings 7d are arranged at intervals along a periphery of the backboard 7.

Figure 3:
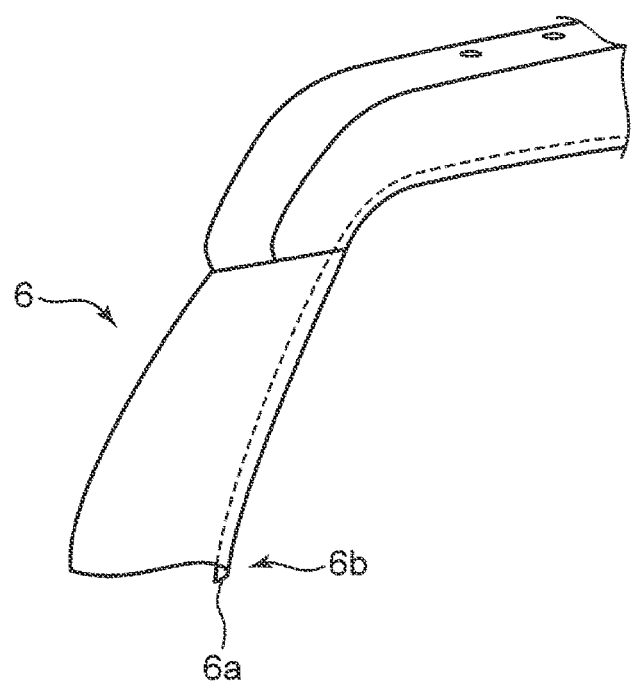
FIG. 3 is a perspective view of an enlarged main portion of the trim cover shown in FIG. 1.

As shown in FIG. 3, the trim cover 6 is a flexible sheet-like member made of, for example, a leather and a plastic sheet, and has a three-dimensional bag shape suitable for covering the front surface 5a, the side surfaces, and the top surface of the seat pad 5. At least a part of an end 6a of the trim cover 6 has a curving shape corresponding to the shape of the end 7b of the backboard 7.

Figure 4A:
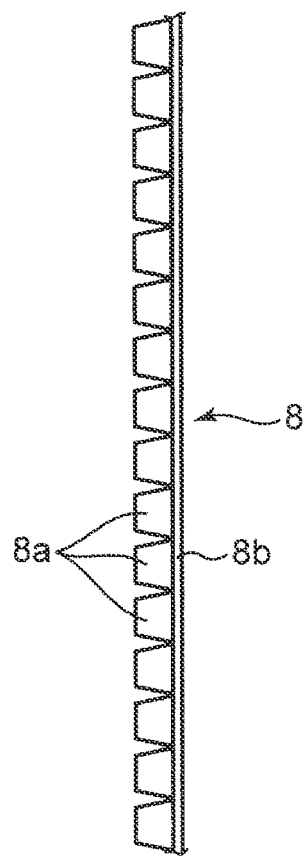
FIGS. 4A and 4B are front views of a terminal member to be attached and having been attached to the trim cover in FIG. 3, specifically.
Figure 4B:
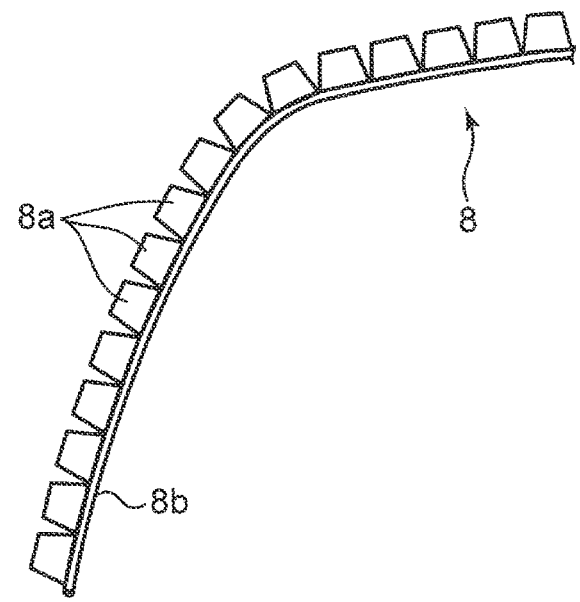
Figure 5:
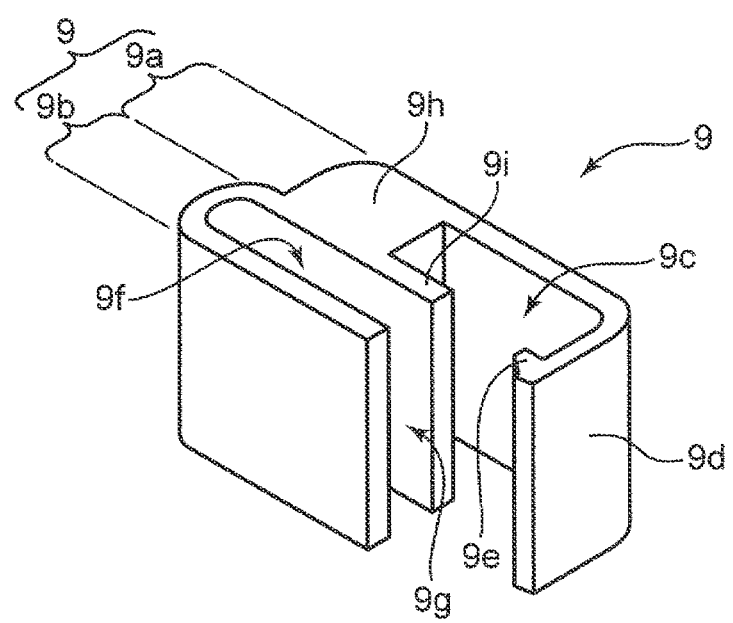
FIG. 5 is a perspective view of the clip in FIG. 2.

The seatback 3 includes a terminal member 8 and the clip 9 for fastening the end 6a of the trim cover 6 to the end 7b of the backboard 7 as shown in FIGS. 4 to 5. The terminal member 8 is attached to the end 6a of the trim cover 6 and connected to the clip 9 attached to the end 7b of the backboard 7.

The terminal member 8 is a strip-like member attached to the trim cover 6 along the end 6a thereof (see FIG. 3) as shown in FIGS. 4A and 4B.

The terminal member 8 has elasticity so as to be deformable along the curving shape of the end 6a of the trim cover 6. The terminal member 8 is made of a soft material, such as a synthetic resin, and manufactured by extrusion molding.

Specifically, the terminal member 8 has a plurality of flat parts 8a and a columnar part 8b extending along edges of the flat parts 8a to connect the edges with each other.

Each of the flat parts 8a has a substantially trapezoid shape. In this regard, the terminal member 8 has a notched shape with notches at edges opposite to the columnar part 8b, and therefore is configured to be easily bendable. The terminal member 8 having this configuration is bendable along the curving surface on the periphery of the backboard 7 (see FIG. 4B).

Each of the flat parts 8a is attached to the trim cover 6 along the end 6a thereof having the curving shape. Specifically, as shown in FIG. 6, a portion of the flat part 8a closer to the columnar part 8b is fixedly sewn to the end 6a of the trim cover 6 at a sewing section 10.

Here, the present invention may adopt another attachment way, e.g., bonding or thermal welding, for fixedly attaching the terminal member 8 to the end 6a of the trim cover 6 without limitation to the sewing.

Figure 6:
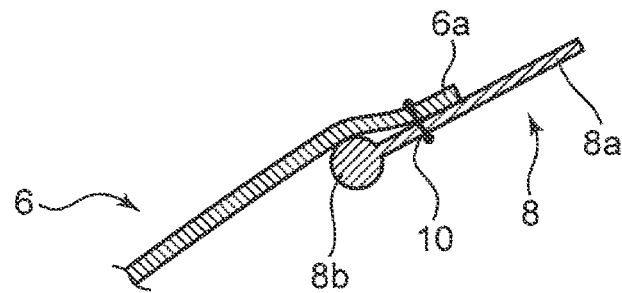
FIG. 6 is a cross-sectional explanatory view showing a state where the terminal member in FIG. 4 is sewn to the end of the trim cover in FIG. 3.

The columnar part 8b has an outer peripheral surface in a curving shape, e.g. a columnar outer peripheral surface shown in FIG. 6.

The flat parts 8a and the columnar part 8b constituting the terminal member 8 preferably have the characteristics described below. Each of the flat parts 8a of the terminal member 8 preferably has: thickness and softness suitable for sewing by a sewing machine; such flexibility as to be appropriately bendable to be placed in a terminal insertion slot 9f of the clip 9 to be described later; and such stiffness as to be held in the terminal insertion slot 9f without coming off from the terminal insertion slot 9f after being placed therein. On the other hand, the columnar part 8b preferably has flexibility so as to be bendable along the curving surface of the backboard 7, and exerts operability of defining a shape of an overlapping section (i.e., an overlapping section of the end 6a of the trim cover 6 with the end 7b of the backboard 7) after having engaged with the clip 9. Moreover, the columnar part 8b has such stiffness as to hold the flat part 8a so that the flat part 8a is held in the terminal insertion slot 9f without coming off from it. The flat part 8a and the entirety of the terminal member 8 including the same are made of, for example, a synthetic resin such as polypropylene.

The clip 9, serving as an exemplary connection member of the present invention, is configured to be attached to the end 7b of the backboard 7 and receive the terminal member 8 connected thereto, as shown in FIGS. 2, 5, and 7. Specifically, the clip 9 has the board-side engagement part 9a which engages with the end 7b of the backboard 7, and a terminal-side engagement part 9b which engages with the flat part 8a of the terminal member 8.

As shown in FIG. 5 and FIG. 7, the board-side engagement part 9a has a keeper 9d for keeping a shape of the end 7b by covering at least a part of the end 7b of the backboard 7. The keeper 9d in the embodiment is bent in an L-shape, and can keep the shape of the end 7b by covering a corner 7e defined by the end 7b and the step 7c of the backboard 7 therebetween. The keeper 9d has a proximal end continuous to a base 9h.

As shown in FIG. 7, the base 9h is inserted in the opening 7d at the end 7b of the backboard 7. In this state, the L-shaped keeper 9d covers the corner 7e of the backboard 7 and comes into contact with the corner 7e via a retainer 9e to be described later.

The board-side engagement part 9a is formed with a board insertion groove 9c defined by the L-shaped keeper 9d, the base 9h, and a partition 9i. The board insertion groove 9c has a size falling within a range suitable so that the board insertion groove 9c allows the end 7b of the backboard 7 to be inserted and held in the board insertion groove 9c.

The board-side engagement part 9a includes the retainer 9e for preventing the end 7b of the backboard 7 placed in the board insertion groove 9c from coming off from the board insertion groove 9c. The retainer 9e is formed at an edge defining an entrance of the board insertion groove 9c at a distal end of the keeper 9d.

The terminal-side engagement part 9b has the terminal insertion slot 9f which allows the flat part 8a of the terminal member 8 to be inserted in the terminal insertion slot 9f to allow the terminal member 8 to be held. As shown in FIG. 7, the terminal insertion slot 9f has an entrance 9g facing in such a direction as to allow the flat part 8a to be inserted in the terminal insertion slot 9f in a state where the end 6a of the trim cover 6 wrapping around the columnar part 8b of the terminal member 8 is folded back to an inside of the trim cover 6.

The clip 9 is manufactured by integral molding using the synthetic resin as a material. The synthetic resin only needs to have elasticity sufficient for engagement with and disengagement from the end 7b of the backboard 7 in the board-side engagement part 9a. Specifically, in a case where a plurality of clips 9 consecutively connected to each other is prepared, the clips 9 preferably have both the appropriate hardness suitable for sewing by a sewing machine and the flexibility suitable for storage and transportation in a roll form. The clips 9 consecutively connected to each other are separable one by one for use. For instance, each clip 9 is made of a synthetic resin, such as polypropylene, having high workability and strength.

Regarding the seat 1 configured in the above-described manner, an operation of attaching the trim cover 6 is performed by fastening the end 6a of the trim cover 6 to the end 7b of the backboard 7.

First, a preliminary stage to be executed before the operation of attaching the trim cover 6 includes sewing the plurality of flat parts 8a of the terminal member 8 to the end 6a of the trim cover 6, as shown in FIG. 6. Specifically, a portion of each of the flat parts 8a closer to the columnar part 8b is sewn on the end 6a of the trim cover 6 at the sewing section 10.

Figure 8A:
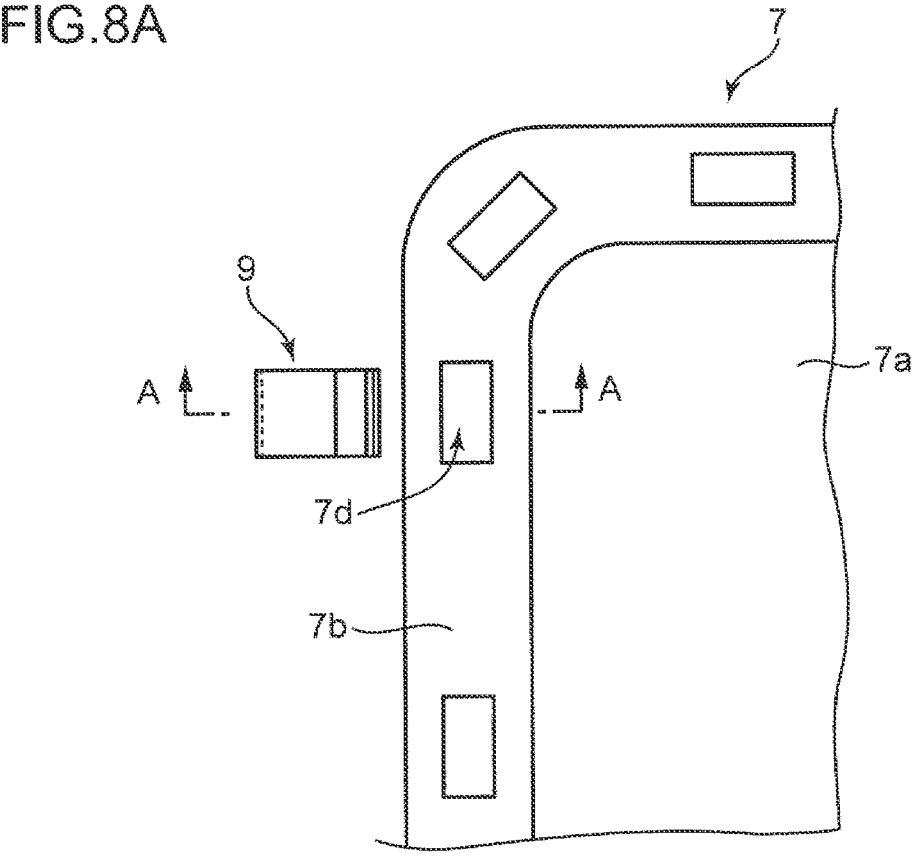
FIGS. 8A and 8B are explanatory views showing a process of an operation of attaching the trim cover in the seat in FIG. 1, specifically.
Figure 8B:
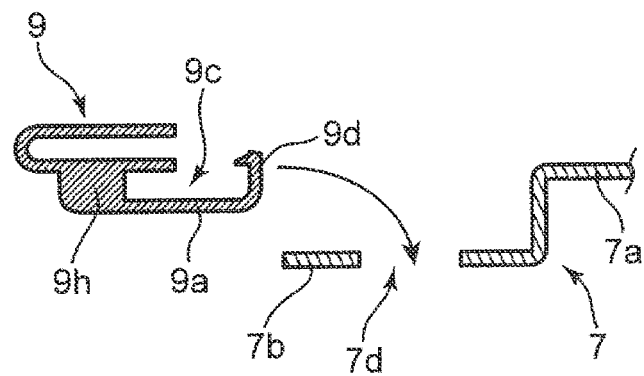

The operation of attaching the trim cover 6 then includes an initial stage of inserting the clip 9 in each of the openings 7d at the end 7b of the backboard 7 disposed on the back surface of the seat pad 5, as shown in FIGS. 8 to 9. Specifically, the L-shaped keeper 9d and the base 9h in the board-side engagement part 9a of the clip 9 are inserted in the opening 7d at the end 7b of the backboard 7. Simultaneously, the L-shaped keeper 9d is to cover the corner 7e of the backboard 7 from an outside thereof and come into contact with the corner 7e via the retainer 9e. The end 7b of the backboard 7 is placed in the board insertion groove 9c in the state where the board-side engagement part 9a (particularly, the base 9h) is inserted in the opening 7d.

Figure 9A:
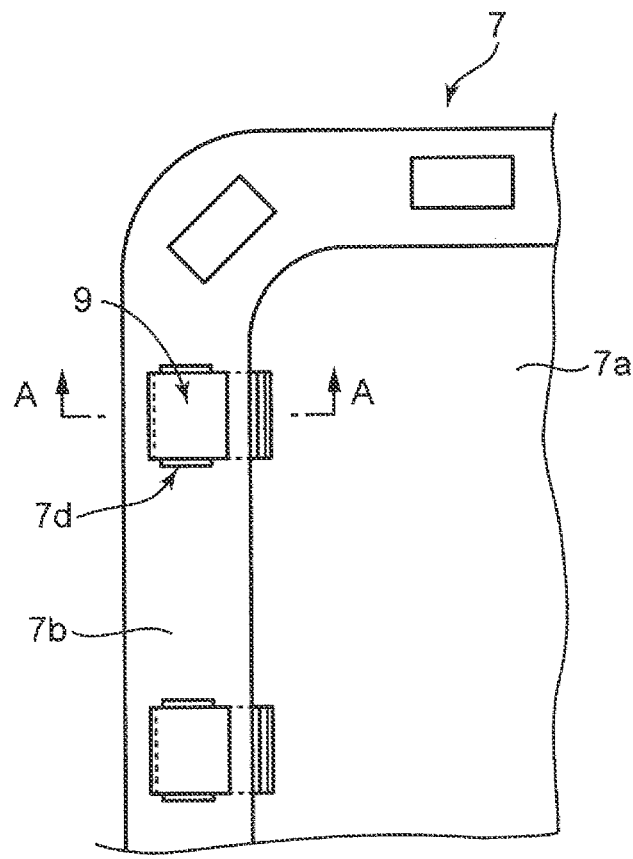
FIGS. 9A and 9B are explanatory views showing the process of the operation of attaching the trim cover in the seat in FIG. 1, specifically.
Figure 9B:
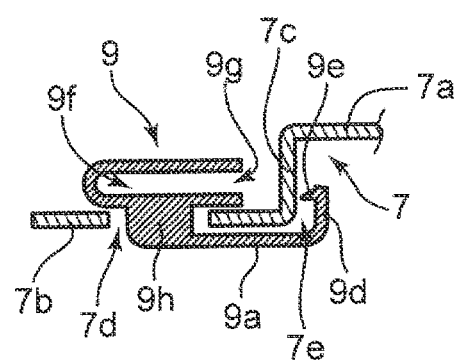

In the state where the clip 9 shown in FIGS. 9A and 9B is attached to the end 7b of the backboard 7, the entrance 9g of the terminal insertion slot 9f of the clip 9 faces the step 7c of the backboard 7. The entrance 9g and the step 7c ensure a narrow space therebetween so that the entrance 9g allows the flat part 8a of the terminal member 8 to be inserted in the entrance 9g.

Then, the trim cover 6 is to cover the front surface 5a, both the side surfaces, and the top surface of the seat pad 5 as shown in FIG. 1.

Figure 10:
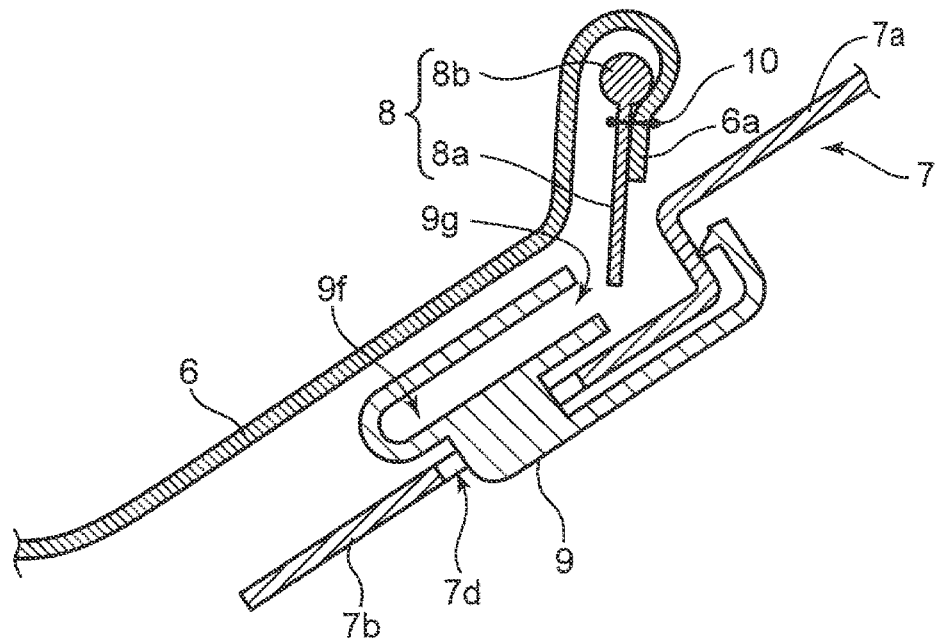
FIG. 10 is an explanatory view showing the process of the operation of attaching the trim cover in the seat in FIG. 1, that is, a cross-sectional explanatory view showing a state just before the terminal member is inserted in a terminal insertion slot of the clip while wrapping the end of the trim cover around a columnar part of the terminal member.

Subsequently, as shown in FIG. 10, the trim cover 6 is made wrap around the columnar part 8b of the terminal member 8 having the curving surface (specifically, a columnar peripheral surface of the columnar part 8b) by wrapping the end 6a of the trim cover 6 around the columnar part 8b of the terminal member 8 while folding the end 6a back to the inside (invisibly from the outside).

Figure 11:
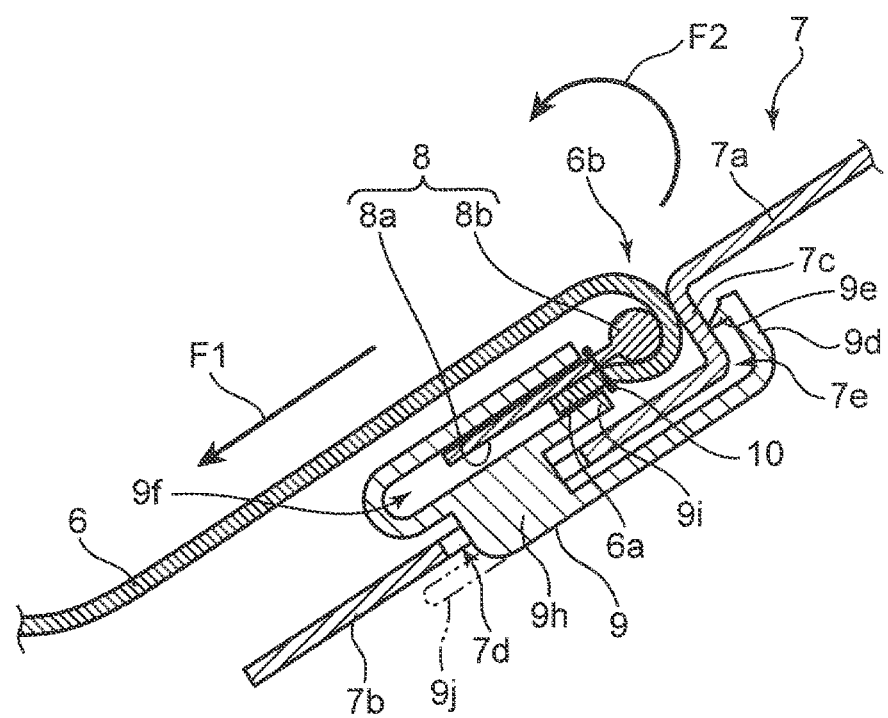
FIG. 11 is an explanatory view showing the process of the operation of attaching the trim cover to the seat in FIG. 1, that is, a cross-sectional explanatory view showing a state where a flat part of the terminal member has been inserted in the terminal insertion slot of the clip.

Thereafter, as shown in FIG. 11, the flat part 8a of the terminal member 8 is inserted in the terminal insertion slot 9f of the clip 9 through the entrance 9g of the terminal insertion slot 9f in the state where the end 6a of the trim cover 6 is folded back inside the trim cover 6 (see the folded-back part 6b). At this time, the columnar part 8b of the terminal member 8 keeps the shape of the end 6a in a state where the outer peripheral surface of the columnar part 8b is in contact with the end 6a of the trim cover 6 at the inside part (folded-back part 6b) that is folded back at the end 6a of the trim cover 6.

The end 6a of the trim cover 6 is folded back to the inside of the trim cover 6 together with the terminal member 8. Accordingly, in addition to the terminal member 8 and the clip 9, the sewing section 10 serving as an attachment section where the terminal member 8 is attached to the end 6a is also covered with the trim cover 6 from the outside thereof.

The terminal member 8 is connected to the clip 9 in the state where the terminal member 8, the clip 9, and the sewing section 10 are covered with an inner part of the trim cover 6 than the folded-back part 6b, so that the end 6a of the trim cover 6 is fastened to the end 7b of the backboard 7. Finally, the operation of attaching the trim cover 6 is completed.

As shown in FIG. 11, the backboard 7 made of a soft material is pulled with a tensile force F1 of the trim cover 6 in the state where the trim cover 6 is attached to the backboard 7, and is about to deform in a direction in which the corner 7e of the backboard 7 extends to be flat. However, the keeper 9d of the clip 9 covers the corner 7e of the backboard 7 from the outside thereof and the partition 9i pushes the inside thereof to thereby suppress the deformation that the corner 7e extends to be flat and increase the stiffness of the backboard 7 (and further keep the shape of the backboard 7). Consequently, deviation in the position of the end of the trim cover 6 attributed to the deformation of the backboard 7 is avoidable, and the appearance of the boundary between the trim cover 6 and the backboard 7 is favorably maintainable.

Moreover, when a rotational force F2 is applied in a direction (rotational direction) where the terminal member 8 comes off from the clip 9 due to the tension of the trim cover 6, the retainer 9e of the clip 9 is hooked by the step 7c of the backboard 7 to thereby prevent the coming-off. Insertion of the clip 9 in the opening 7d of the backboard 7 in the above-described manner enables the clip 9 thus inserted in the opening 7d to be hooked by an edge defining the opening 7d against the tensile force F1 applied in a transverse direction in the introduction of the trim cover 6 (i.e., against a force applied in the direction in which the terminal member 8 connected to the end 6a of the trim cover 6 comes off from the clip 9). This leads to the prevention of the coming-off. At this time, the base 9h of the clip 9 abuts an inner wall defining the opening 7d and stops there, and therefore, the position of the clip 9 relative to the backboard 7 is fixable.

Characteristics of Embodiment (1) The seat 1 according to the embodiment includes the terminal member 8 attached to the trim cover 6 along the end 6a thereof, and the clip 9 serving as the connection member and attached to the end 7b of the backboard 7 for connecting the terminal member 8 thereto. The terminal member 8 is connected to the clip 9 in the state where the terminal member 8 and the clip 9 are covered with the trim cover 6 from the outside, so that the end 6a of the trim cover 6 is fastened to the end 7b of the backboard 7. The terminal member 8 and the clip 9 serving as the attachment section for attaching the trim cover 6 to the backboard 7 are invisible from the outside in the state where the trim cover 6 is fixedly attached to the backboard 7 in the aforementioned manner. Consequently, the appearance of the seat 1 is improved.

In this configuration, the shape of the backboard 7 made of the soft material can be kept, and the trim cover 6 is attachable with a good appearance.

Furthermore, in the configuration of the seat 1 according to the embodiment, the terminal member 8 attached to the end 6a of the trim cover 6 only needs to be connected to the clip 9 attached to the end 7b of the backboard 7. The connection eliminates the necessity of the operation of sewing the end 6a of the trim cover 6 to the end 7b of the backboard 7.

(2) Particularly, in the embodiment, the end 6a of the trim cover 6 is folded back to the inside of the trim cover 6 together with the terminal member 8, so that the terminal member 8 is covered with the trim cover 6 from the outside. The terminal member 8 is connected to the clip 9 in the state where the clip 9 is covered with the inner part of the trim cover 6 than the folded-back part 6b. Folding the trim cover 6 back in the above-described manner makes the terminal member 8 and the clip 9 invisible from the outside. Accordingly, the appearance of the seat 1 is easily and reliably improvable.

Even in a case where the end 6a of the trim cover 6 is not folded back to the inside of the trim cover 6, the terminal member 8 and the clip 9 serving as the attachment section for attaching the trim cover 6 to the backboard 7 become invisible from the outside as long as the trim cover 6 is fixedly attached to the backboard 7 in the state where the terminal member 8 and the clip 9 are covered with the trim cover 6. Consequently, the appearance of the seat 1 is improved.

(3) In the seat 1 according to the embodiment, at least a part of the end 6a of the trim cover 6 has a curving shape along the shape of the end 7b of the backboard 7. The terminal member 8 has elasticity so as to be deformable along the curving shape. Even when the end 6a of the trim cover 6 has the curving shape, this configuration permits the terminal member 8 to deform along the curving shape, so that the terminal member 8 is easily attachable to the trim cover 6 along the end 6a thereof as shown in FIG. 4B. Moreover, after the attachment of the terminal member 8, the terminal member 8 can keep the curving shape of the end 6a of the trim cover 6, resulting in preventing an occurrence of creases at the end 6a.

(4) In the seat 1 according to the embodiment, the clip 9 has the board-side engagement part 9a which engages with the end 7b of the backboard 7. In this configuration, the clip 9 is fixedly attachable to the end 7b of the backboard 7 by engaging the board-side engagement part 9a of the clip 9 with the end 7b of the backboard 7. This configuration can facilitate the operation of connecting the terminal member 8 attached to the end 6a of the trim cover 6 to the end 7b of the backboard 7 via the clip 9. As a result, the operability is improved.

(5) Furthermore, in the seat 1 according to the embodiment, the board-side engagement part 9a has the keeper 9d configured to keep the shape of the end 7b by covering at least a part of the end 7b of the backboard 7. In this configuration, the board-side engagement part 9a can keep the shape of the end 7b of the backboard 7 by covering at least a part of the end 7b. This reduces the possibility that the end 7b of the backboard 7 deforms even with the tensile force acting on the trim cover 6 in the state where the trim cover 6 is attached to the backboard 7. As a result, a beautiful finishing line for the trim cover 6 is attainable even with the backboard 7 made of a soft material.

(6) In the seat 1 according to the embodiment, the end 7b of the backboard 7 is located to define the step 7b between the end 7b and the main body 7a of the backboard 7. The board-side engagement part 9a is configured to keep the shape of the end 7b of the backboard 7 by covering the corner 7e defined by the end 7b and the step 7c of the backboard 7. In this configuration even including the step 7c defined by the end 7b of the backboard 7 and the main body 7a of the backboard 7, the board-side engagement part 9a can keep the shape of the end 7b by covering the corner 7e defined by the end 7b and the step 7c of the backboard 7. As a result, the beautiful finishing line for the trim cover 6 is attainable even with the presence of the step 7c between the main body 7a and the end of the backboard 7 since the possibility that the end 7b of the backboard 7 deforms reduces.

Here, in the presence of the step 7c, aligning the main body 7a and the trim cover 6, when holding the terminal member 8 with the clip 9, achieves a configuration where the trim cover 6 and the backboard 7 are flush with each other across the boundary therebetween. Consequently, the appearance is improvable.

(7) In the seat 1 according to the embodiment, the board-side engagement part 9a has the board insertion groove 9c which allows the end 7b of the backboard 7 to be inserted and held in the board insertion groove 9c. In this configuration, the end 7b of the backboard 7 is inserted in the board insertion groove 9c of the board-side engagement part 9a of the clip 9 so that the end 7b is holdable. This consequently facilitates the attachment of the clip 9 to the end 7b of the backboard 7.

(8) In the seat 1 according to the embodiment, the board-side engagement part 9a includes the retainer 9e for preventing the end 7b of the backboard 7 placed in the board insertion groove 9c from coming off from the board insertion groove 9c. The retainer 9e thus can prevent the end 7b of the backboard 7 placed in the board insertion groove 9c from coming off from the board insertion groove 9c.

Here, the retainer 9e shown in FIG. 7 is in contact with the surface of the step 7c of the backboard 7. The surface of the step 7c may be formed with a protrusion or a recess configured to further prevent the clip 9 from falling off (i.e., the clip 9 is to be fixedly fitted thereto or therein) with the aim of increasing the engaging force of the retainer 9e.

(9) In the seat 1 according to the embodiment, the end 7b of the backboard 7 has the opening 7d which allows the board-side engagement part 9a to be inserted in the opening 7d. The end 7b of the backboard 7 is placed in the board insertion groove 9c in the state where the board-side engagement part 9a is inserted in the opening 7d. In this configuration, the insertion of the board-side engagement part 9a of the clip 9 in the opening 7d at the end 7b of the backboard 7 enables the clip 9 to be fixedly attached to the end 7b of the backboard 7 at a predetermined position thereof. Furthermore, the end 7b of the backboard 7 is placed in the board insertion groove 9c in the state where the board-side engagement part 9a is inserted in the opening 7d. This reduces the possibility that the clip 9 falls off the end 7b of the backboard 7.

Moreover, the base 9h may be provided with, for example, an extension 9j (see FIG. 11) for falling-out prevention at a corner of the base 9h in the vicinity of the opening 7d to prevent the clip 9 from falling out of the opening 7d at the end 7b of the backboard 7.

(10) In the seat 1 according to the embodiment, the clip 9 serving as the connection member is made of a synthetic resin having elasticity so as to be engageable with and disengageable from the end 7b of the backboard 7 in the board-side engagement part 9a. In this configuration, the elasticity of the synthetic resin forming the clip 9 is sufficient for the engagement with or the disengagement from the end 7b of the backboard 7 in the board-side engagement part 9a. This simplifies the structure of the clip 9 serving as the connection member, and facilitates the operation of attaching the trim cover 6 with use of the connection member. In the embodiment, the clip 9 made of the synthetic resin is adoptable at a preferable number in a preferable arrangement at the end 7b of the backboard 7.

(11) In the seat 1 according to the embodiment, the terminal member 8 has the flat part 8a. The clip 9 has the terminal insertion slot 9f for holding the terminal member 8 by receiving the flat part 8a inserted therein. In this configuration, the insertion of the flat part 8a of the terminal member 8 in the terminal insertion slot 9f of the clip 9 enables the clip 9 to hold the terminal member 8. This facilitates the operation of attaching the trim cover 6 with use of the terminal member 8 and the clip 9.

(12) In the seat 1 according to the embodiment, the flat part 8a is attached to the end 6a of the trim cover 6. The terminal insertion slot 9f has the entrance 9g facing in such a direction as to allow the flat part 8a to be inserted in the terminal insertion slot 9f in the state where the end 6a of the trim cover 6 is folded back to the inside of the trim cover 6.

In this configuration, the flat part 8a of the terminal member 8 is inserted in the terminal insertion slot 9f of the clip 9 in the state where the end 6a of the trim cover 6 is folded back to the inside of the trim cover 6. In this way, the trim cover 6 is attached in the state where the end thereof is folded back to the inside. Accordingly, the section where the flat part 8a of the terminal member 8 is attached to the end 6a of the trim cover 6 is invisible from the outside. As a result, the beautiful assembly line for the trim cover 6 is attainable.

Even when the tensile force acts on the trim cover 6 and a force is applied in a direction (in the same direction as the direction in which the rotational force F2 is applied in FIG. 11) in which the terminal member 8 comes off, the clip 9 is prevented from falling out and thus the rotation is stopped. Hence, there is no possibility that the flat part 8a of the terminal member 8 rotates together with the terminal insertion slot 9f of the clip 9 and comes out thereof. Additionally, the abutment of the columnar part 8b of the terminal member 8 to the step 7c of the backboard 7 prevents the coming-off. In this configuration, the flat part 8a of the terminal member 8 is unlikely to come off. This eliminates the necessity of providing the terminal insertion slot 9f of the clip 9 with a "barb" or "protrusion" for preventing the flat part 8a from coming off. Accordingly, the flat part 8a is easily insertable in the terminal insertion slot 9f.

(13) In the seat 1 according to the embodiment, the terminal member 8 further has the columnar part 8b along an edge of the flat part 8a. The columnar part 8b has the outer peripheral surface in a curving shape. The columnar part 8b keeps the shape of the end 6a of the trim cover 6 in the state where the peripheral surface is in contact with the end 6a from the inside of the folded-back part at the end 6a.

In this configuration, the columnar part 8b of the terminal member 8 has the outer peripheral surface in the curving shape, and the columnar part 8b keeps the shape of the end 6a of the trim cover 6 in the state where the outer peripheral surface is in contact with the end 6a from the inside of the folded-back part at the end 6a. In other words, the shape can be kept with the end 6a of the trim cover 6 wrapping around the columnar part 8b. This configuration permits the end 6a of the trim cover 6 to be fastened to the end 7b of the backboard 7 without any gap therebetween while maintaining the beautiful appearance so that the folded-back part at the end 6a of the trim cover 6 has the curving surface.

(14) In the seat 1 according to the embodiment, the terminal member 8 and the clip 9 are configured to be attachable to and detachable from each other. Therefore, the end 6a of the trim cover 6 can be easily fastened to the end 7b of the backboard 7 by releasably connecting the terminal member 8 to the clip 9. Additionally, release of the connection between the terminal member 8 and the clip 9 achieves easy removal of the trim cover 6, and further facilitates replacement of the trim cover 6.

Modifications (A) Although the end 7b of the backboard 7 is formed with the plurality of openings 7d and each of the openings 7d receives the clip 9 serving as the connection member inserted therein in the example of the embodiment, the present invention is not limited thereto. A modification of the present invention may include a configuration where a clip 9 has a board-side engagement part 9a covering an entirety of an end 7b of a backboard 7 as shown in FIGS. 12 to 16.

Specifically, the clip 9 shown in FIGS. 12 to 16 has a configuration including a board insertion groove 9c having a larger length than that in the clip 9 shown in FIG. 5 for accommodating the entirety of the end 7b of the backboard 7, while excluding a base part 9h to ensure the length. The clip 9 shown in FIGS. 12 to 16 has the same configurations as that of the clip 9 shown in FIG. 5 in the remaining perspectives, and thus the explanation therefor will be omitted.

Figure 12:
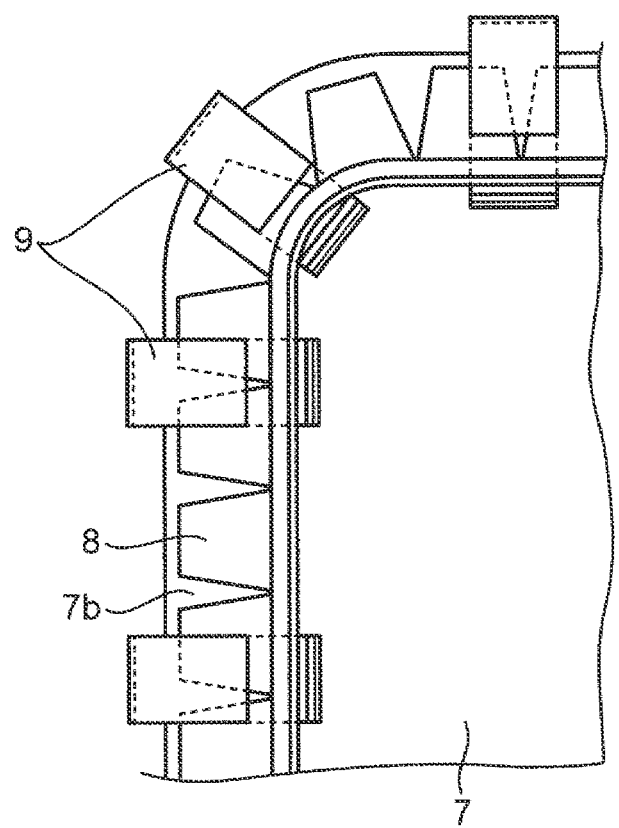
FIG. 12 is an explanatory view showing a configuration where a clip covers an entirety of an end of a backboard in a modification of the present invention.
Figure 13:
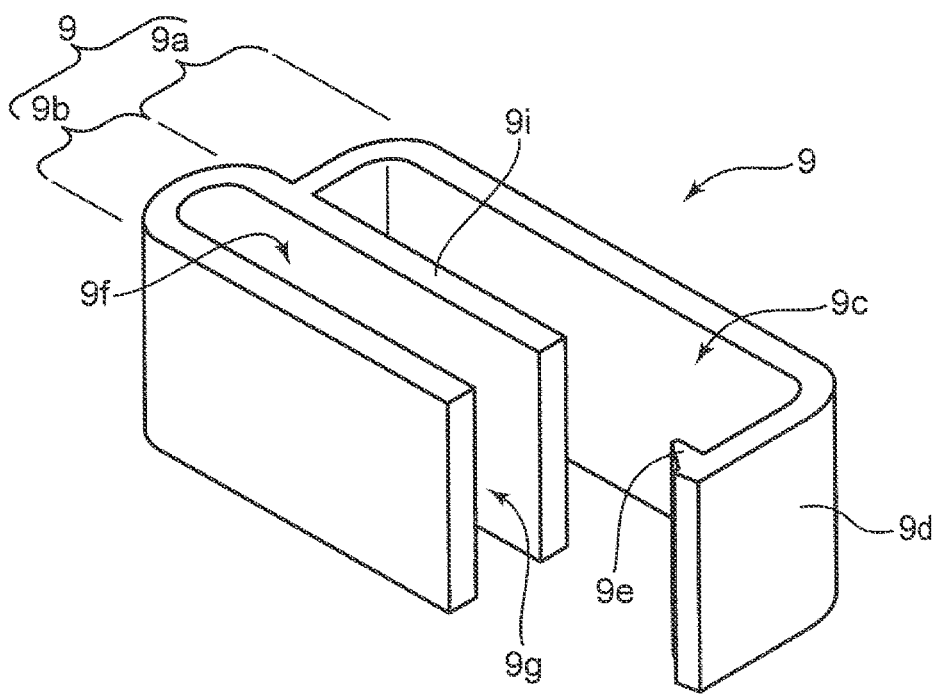
FIG. 13 is a perspective view of the clip in FIG. 12.
Figure 14:
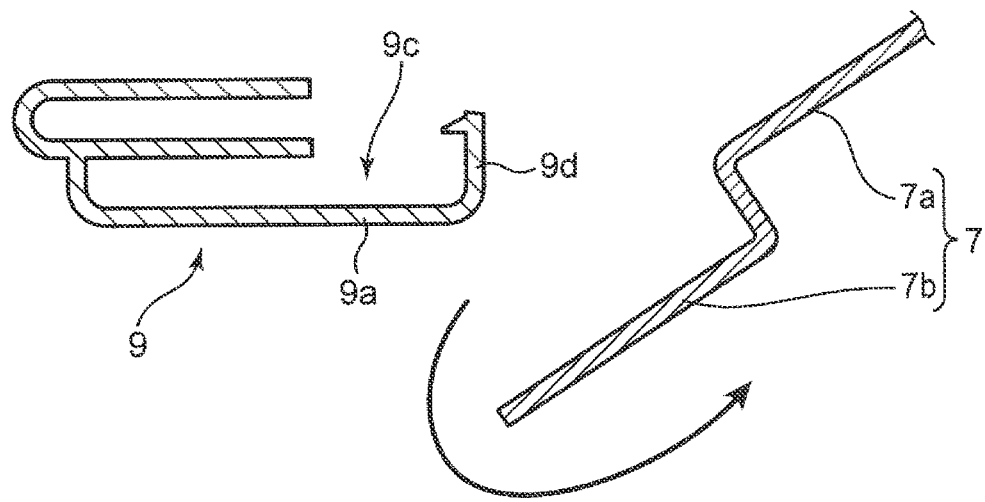
FIG. 14 is an explanatory view showing a process of an operation of attaching a trim cover in the modification in FIG. 12, that is, a cross-sectional explanatory view showing a state of the clip to be attached to an end of the backboard.
Figure 15:
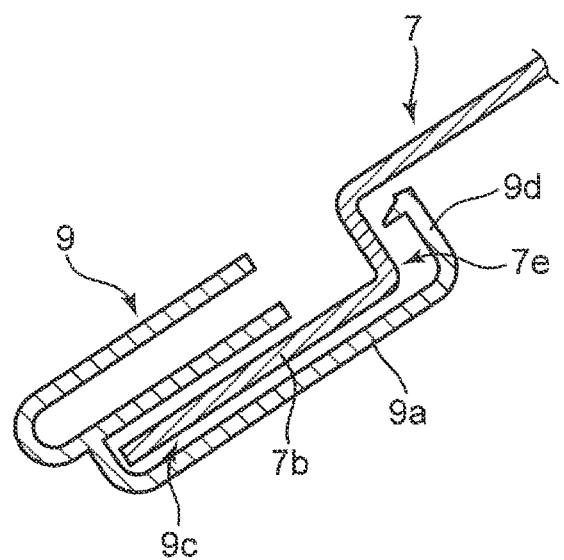
FIG. 15 is an explanatory view showing the process of the operation of attaching the trim cover in the modification in FIG. 12, that is, a cross-sectional explanatory view showing a state of the clip having been attached to the end of the backboard.
Figure 16:
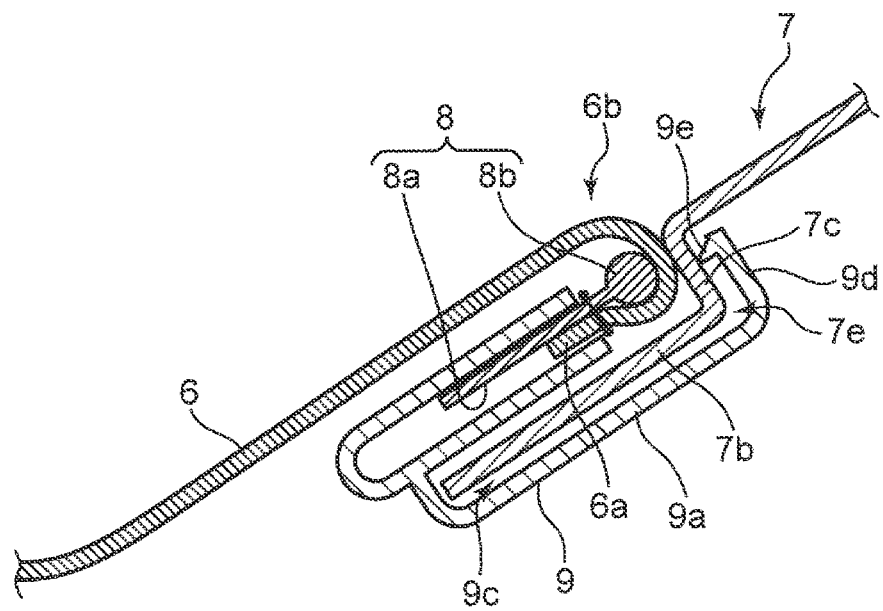
FIG. 16 is an explanatory view showing the process of the operation of attaching the trim cover in the modification in FIG. 12, that is a cross-sectional explanatory view showing a state where a flat part of a terminal member has been inserted in a terminal insertion slot of the clip.

In the clip 9 shown in FIGS. 12 to 16, the board insertion groove 9c having a length which can accommodate the entirety of the end 7b of the backboard 7, and hence the board-side engagement part 9a of the clip 9 can cover the entirety of the end 7b the backboard 7. In other words, the board insertion groove 9c of the board-side engagement part 9a accommodates the entirety of the end 7b of the backboard 7. In this state, a corner 7e defined by the end 7b and a step 7c is kept by an L-shaped keeper 9d. Accordingly, the clip 9 provides a high effect of holding the entirety of the end 7b and the corner 7e. This further exerts a high effect of keeping the shape of the backboard 7. Moreover, this configuration eliminates the necessity of forming an opening in the backboard 7, and thus simplifies the structure of the backboard 7. Furthermore, the clip 9 is attachable to the end 7b of the backboard 7 at a preferable position on the entire periphery thereof, and hence the trim cover 6 is attachable in an optimal tension state, as shown in FIG. 12.

The clip 9 shown in FIGS. 12 to 16 can exert the operational effects similar to those in the configuration according to the embodiment shown in FIGS. 1 to 11 except the effect related to the opening 7d, that is, the operational effects in the items (1) to (12) in the above-described "characteristics of embodiment" except the effect described in item (9).

(B) Although the exemplary configuration where the terminal member 8 and the clip 9 are attachable to and detachable from each other is described in the embodiment, the present invention is not limited thereto. Another configuration may be adopted as long as the terminal member and the connection member are attachable to and detachable from each other.

Figure 19:
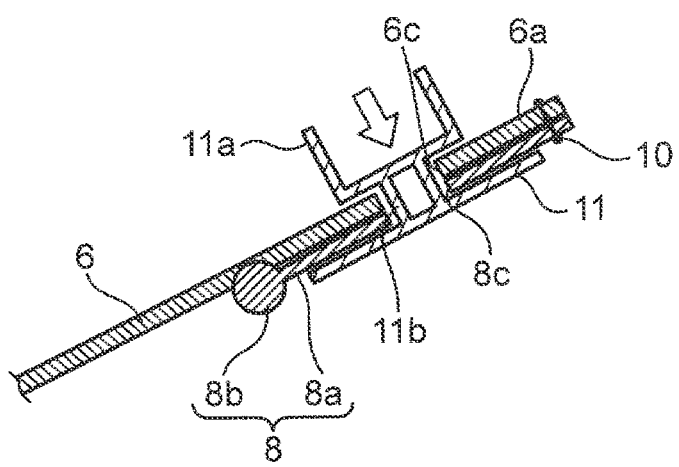
FIG. 19 is a cross-sectional explanatory view showing a state where a female hook is caulked to the trim cover and the terminal member in FIG. 17.
Figure 20:
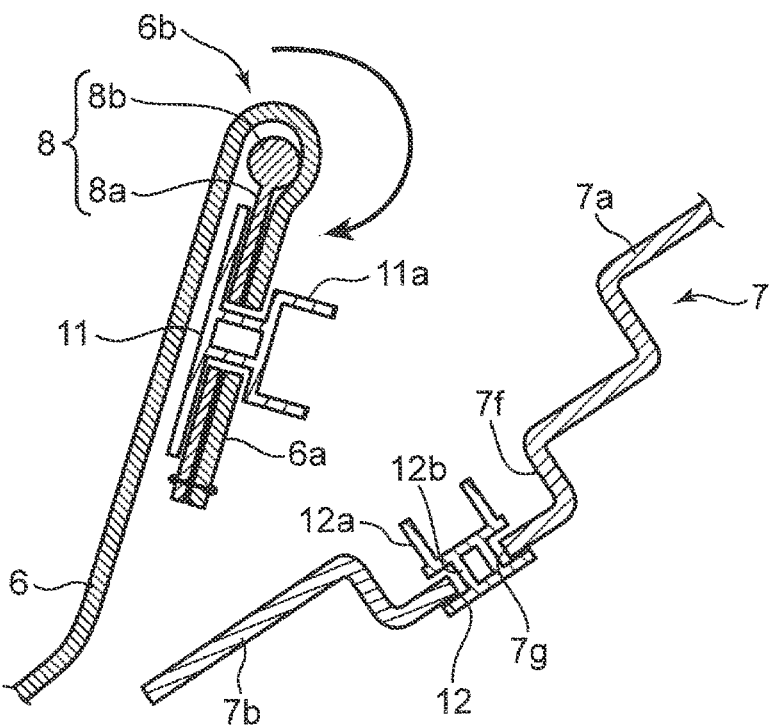
FIG. 20 is a cross-sectional explanatory view showing a state just before the female hook at the trim cover is engaged with a male hook at a backboard while wrapping an end of the trim cover in FIG. 19 around a columnar part of the terminal member.
Figure 21:
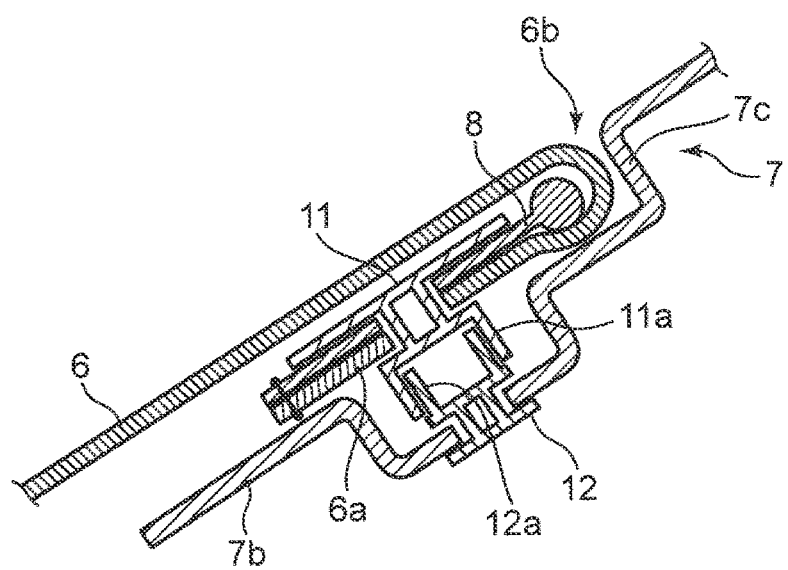
FIG. 21 is a cross-sectional explanatory view showing a state where the female hook at the trim cover in FIG. 20 is engaged with the male hook at the backboard.

For instance, as shown in FIGS. 19 to 21, another modification of the present invention may include a configuration where a terminal member and a connection member are attachable to and detachable from each other by using a button-type hook unit including a female hook 11 and a male hook 12 attachable to and detachable from each other.

Figure 18:
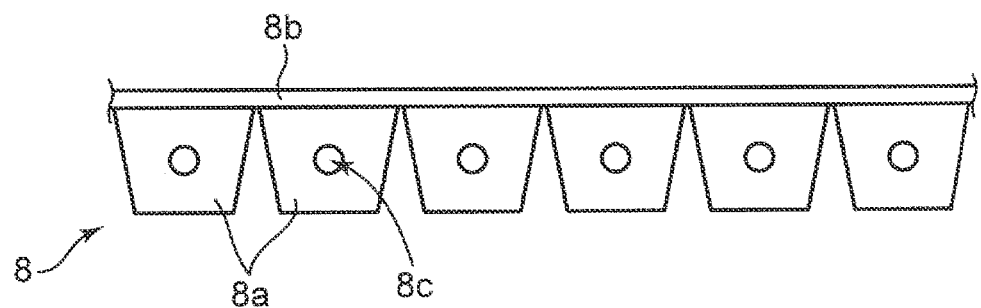
FIG. 18 is a front view of the terminal member formed with the through holes in FIG. 17.

Specifically, in the modification, a structure where the female hook 11 is attached to the terminal member 8 is used as the terminal member, and the male hook 12 attached to an end 7b of a backboard 7 is used as the connection member. The female hook 11 and the male hook 12 may be interchanged. As shown in FIG. 18, the terminal member 8 has a flat part 8a formed with a through hole 8c adaptably to the modified configuration.

Figure 17:
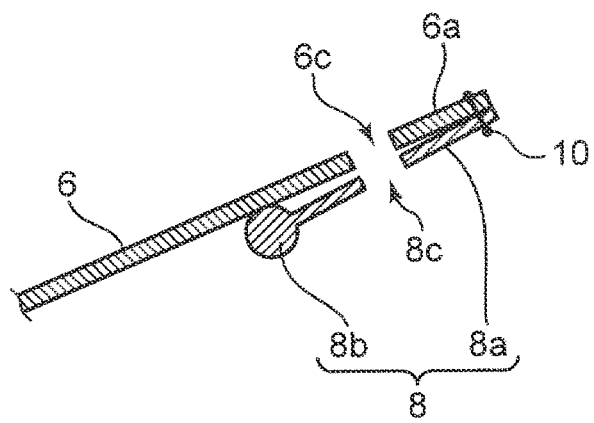
FIG. 17 is a cross-sectional explanatory view showing a state where a terminal member is sewn to a trim cover so that through holes align with each other in another modification of the present invention.

In this modification, the flat part 8a of the terminal member 8 is sewn on an end 6a of a trim cover 6 at a sewing section 10 at an edge opposite to the edge along which a columnar part 8b extends, as shown in FIGS. 17 and 19. In this state, the flat part 8a is arranged so that the through hole 8c is aligned with a through hole 6c formed in the trim cover 6. The female hook 11 has a receiving part 11a and a shaft part 11b. The female hook 11 is fixedly attached to the flat part 8a and the trim cover 6 by caulking in a state where the shaft part 11b is inserted in the through hole 8c of the flat part 8a and the through hole 6c of the trim cover 6. In this case, the receiving part 11a is located opposite the flat part 8a in the trim cover 6.

In contrast, the end 7b of the backboard 7 is formed with a recess 7f as shown in FIG. 20. Further, the recess 7f is defined by a bottom surface formed with a through hole 7g. The male hook 12 has a protruding part 12a and a shaft part 12b. The male hook 12 is fixedly attached to the bottom surface by caulking in a state where the shaft part 12b is inserted in the through hole 7g of the bottom surface defining the recess 7f of the backboard 7. In this case, the protruding part 12a is arranged inside the recess 7f of the backboard 7.

When the trim cover 6 is fixedly attached to the backboard 7 in this modification, the end 6a of the trim cover 6 is folded back at the columnar part 8b of the terminal member 8 having a columnar outer peripheral surface, and the female hook 11 is engaged with the male hook 12 at the backboard 7 so as to be invisible from the outside after the attachment, as shown in FIGS. 20 to 21. Specifically, engagement of the protruding part 12a of the male hook 12 and the receiving part 11a of the female hook 11 with each other allows the end 6a of the trim cover 6 to be fastened to the end 7b of the backboard 7.

The trim cover 6 and the terminal member 8 are restricted to the backboard 7 via the female hook 11 and the male hook 12 in the state where the trim cover 6 has been attached as shown in FIG. 21. The restriction reduces the possibility that the trim cover 6 deviates with respect to the backboard 7 even when the trim cover 6 is tensioned. Accordingly, a clear boundary between the backboard 7 and the trim cover 6 (specifically, a boundary between the step 7c of the backboard 7 and the folded-back part 6b of the trim cover 6) is attainable without any gap therebetween. Furthermore, the female hook 11 and the male hook 12 are located inside the trim cover 6, and hence are invisible from the outside.

As described above, in the modification shown in FIGS. 19 to 21, the structure where the female hook 11 is attached to the terminal member 8 is used as the terminal member, and the male hook 12 attached to an end 7b of a backboard 7 is used as the connection member. The terminal member (including the terminal member 8 and the female hook 11) and the connection member (the male hook 12) are configured to be attachable to and detachable from each other. In this configuration, the end 6a of the trim cover 6 can be easily fastened to the end 7b of the backboard 7 by releasably connecting the female hook 11 forming the terminal member and the male hook 12 serving as the connection member with each other. Additionally, release of the connection between the female hook 11 and the male hook 12 achieves easy removal of the trim cover 6, and further facilitates replacement of the trim cover 6.

Moreover, the modification shown in FIGS. 18 to 21 also can exert the operational effect similar to that described in the item (1) in "characteristics of embodiment". Specifically, the female hook 11 is connected to the male hook 12 in the state where the terminal member 8, the female hook 11, and the male hook 12 are covered with the trim cover 6 from the outside, so that the end 6a of the trim cover 6 is fastened to the end 7b of the backboard 7 in the modification shown in FIGS. 18 to 21 as well. The terminal member (including the terminal member 8, the female hook 11) and the connection member (the male hook 12) serving as the attachment section for attaching the trim cover 6 to the backboard 7 are invisible from the outside in the state where the trim cover 6 is fixedly attached to the backboard 7 in the aforementioned manner. Consequently, the appearance of the seat 1 is improved. In this configuration, the shape of the backboard 7 made of the soft material can be kept, and the trim cover 6 is attachable with a good appearance. Furthermore, the female hook 1 fixedly attached to the terminal member 8 attached to the end 6a of the trim cover 6 may be sufficiently connected to the male hook 12. The connection eliminates the necessity of the operation of sewing the end 6a of the trim cover 6 to the end 7b of the backboard 7.

(C) Other adoptable configurations for achieving the mutual attachment and detachment between the terminal member and the connection member includes a configuration having a hook-and-loop faster or a magnet in addition to the configuration of the button-type hook unit (including the female hook 11 and the male hook 12) described in item (B).

(D) Although the board-side engagement part 9a of the clip 9 serving as the connection member has the board insertion groove 9c for holding the end 7b of the backboard 7 by receiving the end 7b inserted therein as shown in FIG. 5 in the embodiment, the present invention is not limited thereto. Adoptable is a reversed configuration, i.e., a configuration where the board-side engagement part 9a may have a protrusion, and an end 7b of the backboard 7 may be formed with a groove or recess which allows the protrusion to be inserted in the groove or recess. Even in this case, the board-side engagement part 9a of the clip 9 is engageable with and disengageable from the end 7b of the backboard 7.

(E) Although the clip 9 serving as the connection member has the terminal insertion slot 9f and is configured to hold the terminal member 8 by receiving the flat part 8a of the terminal member 8 inserted in the terminal insertion slot 9f as shown in FIG. 5 in the embodiment, the present invention is not limited thereto. Adoptable is a reversible configuration, i.e., a configuration where the clip 9 may have a flat part or a protrusion, and the terminal member 8 may have a recess or slot which allows the flat part or the protrusion to be inserted in the recess or slot. Even in this case, the clip 9 can hold the terminal member 8.

Summary of Embodiment

The embodiment is summarized in the following manner.

A seat according to the embodiment includes: a seat pad having a front surface and a back surface; a backboard disposed on the back surface of the seat pad; a trim cover covering the front surface of the seat pad; a terminal member attached to the trim cover along an end of the trim cover; and a connection member attached to an end of the backboard for connecting the terminal member thereto. The terminal member is connected to the connection member in a state where the terminal member and the connection member are covered with the trim cover from an outside, so that the end of the trim cover is fastened to the end of the backboard.

This configuration includes the terminal member attached to the trim cover along the end of the trim cover, and the connection member attached to the end of the backboard for connecting the terminal member thereto. The terminal member is connected to the connection member in the state where the terminal member and the connection member are covered with the trim cover from the outside, so that the end of the trim cover is fastened to the end of the backboard. The terminal member and the connection member serving as the attaching section for attaching the trim cover to the backboard are invisible from the outside in the state where the trim cover is fixedly attached to the backboard. Consequently, the appearance of the seat is improved.

In the seat, preferably, the end of the trim cover is folded back to an inside of the trim cover together with the terminal member, so that the terminal member is covered with the trim cover from the outside, and the terminal member is connected to the connection member in a state where the connection member is covered with an inner part of the trim cover than a folded-back part of the trim cover.

In this configuration, the end of the trim cover is folded back to the inside of the trim cover together with the terminal member, so that the terminal member is covered with the trim cover from the outside. The terminal member is connected to the connection member in the state where the connection member is covered with the inner part of the trim cover than the folded-back part. Folding the trim cover back in the above-described manner makes the terminal member and the connection member invisible from the outside. Accordingly, the appearance of the seat is easily and reliably improvable.

In the seat, at least a part of the end of the trim cover preferably has a curving shape. The terminal member preferably has elasticity so as to be deformable along the curving shape.

In the configuration even with the end of the trim cover in the curving shape, the terminal member is easily attachable to the trim cover along the end of the trim cover by deforming the terminal member along the curving shape. Moreover, after the attachment of the terminal member, the terminal member can keep the curving shape of the end of the trim cover, resulting in preventing an occurrence of creases at the end.

In the seat, the connection member preferably has a board-side engagement part which engages with the end of the backboard. The board-side engagement part is preferably configured to cover at least a part of the end of the backboard and keeping a shape of the end.

In this configuration, the connection member is fixedly attachable to the end of the backboard by engaging the board-side engagement part of the connection member with the end of the backboard. This configuration can facilitate the operation of connecting the terminal member attached to the end of the trim cover to the end of the backboard via the connection member. Consequently, the operation of attaching the trim cover is improved.

In addition to this, in this configuration, the board-side engagement part can keep the shape of the end of the backboard by covering at least a part of the end. This reduces the possibility that the end of the backboard deforms even with the tensile force acting on the trim cover in the state where the trim cover is attached to the backboard. As a result, the beautiful finishing line for the trim cover is attainable.

In the seat, the end of the backboard is preferably located so as to define a step between the end of the backboard and a main body of the backboard. The board-side engagement part is preferably configured to keep the shape of the end of the backboard by covering a corner defined by the end and the step of the back-board.

In this configuration even including the step defined between the end of the backboard and the main body of the backboard, the board-side engagement part can keep the shape of the end by covering the corner defined by the end and the step of the backboard. A s a result, the beautiful finishing line for the trim cover is attainable even with the presence of the step between the main body and the end of the backboard since the possibility that the end of the backboard deforms reduces.

In the seat, the board-side engagement part preferably has a board insertion groove which allows the end of the backboard to be inserted and held in the board insertion groove.

In this configuration, the end of the backboard is inserted in the board insertion groove of the board-side engagement part of the connection member so that the end is holdable. This consequently facilitates the attachment of the connection member to the end of the backboard.

In the seat, the board-side engagement part preferably further includes a retainer for preventing the end of the backboard placed in the board insertion groove from coming off from the board insertion groove.

In this configuration, the retainer can prevent the end of the backboard placed in the board insertion groove from coming off from the board insertion groove.

In the seat, preferably, the end of the backboard has an opening which allows the board-side engagement part to be inserted in the opening, and the end of the backboard is placed in the board insertion groove in a state where the board-side engagement part is inserted in the opening.

In this configuration, the insertion of the board-side engagement part of the connection member in the opening at the end of the backboard enables the connection member to be fixedly attached to the end of the backboard at a predetermined position thereof. Furthermore, the end of the backboard is placed in the board insertion groove in the state where the board-side engagement part is inserted in the opening. This reduces the possibility that the connection member falls off the end of the backboard.

In the above-described seat, the connection member is preferably made of a synthetic resin having elasticity so as to be engageable with and disengageable from the end of the backboard in the board-side engagement part.

In this configuration, the elasticity of the synthetic resin forming the connection member is sufficient for the engagement with or the disengagement from the end of the backboard in the board-side engagement part. This simplifies the structure of the connection member, and facilitates the operation of attaching the trim cover with use of the connection member.

In the seat, preferably, the terminal member has a flat part, and the connection member has a terminal insertion slot which allows the flat part to be inserted in the terminal insertion slot to allow the terminal member held in the terminal insertion slot.

In this configuration, the insertion of the flat part of the terminal member in the terminal insertion slot of the connection member enables the connection member to hold the terminal member. This facilitates the operation of attaching the trim cover with use of the terminal member and the connection member.

In the seat, preferably, the flat part is attached to the end of the trim cover, and the terminal insertion slot has an entrance facing in such a direction as to allow the flat part to be inserted in the terminal insertion slot in a state where the end of the trim cover is folded back to the inside of the trim cover.

In this configuration, the flat part of the terminal member is inserted in the terminal insertion slot of the connection member in the state where the end of the trim cover is folded back to the inside of the trim cover. In this way, the trim cover is attached in the state where the end thereof is folded back to the inside. Accordingly, the section where the flat part of the terminal member is attached to the end of the trim cover is invisible from the outside. As a result, the beautiful finishing line for the trim cover is attainable.

In the above-described seat, preferably, the terminal member further has a columnar part along an edge of the flat part, the columnar part having an outer peripheral surface in a curving shape, and keeping the shape of the end of the trim cover in a state where the outer peripheral surface is in contact with the end of the trim cover from an inside of the folded-back part at the end of the trim cover.

In this configuration, the columnar part of the terminal member has the outer peripheral surface in the curving shape, and the columnar part keeps the shape of the end in the state where the outer peripheral surface is in contact with the end from the inside of the folded-back part at the end of the trim cover. This configuration permits the end of the trim cover to be fastened to the end of the backboard without any gap therebetween while maintaining the beautiful appearance so that the folded-back part at the end of the trim cover has the curving surface.

In the seat, the terminal member and the connection member may be configured to be attachable to and detachable from each other.

In the configuration, the end of the trim cover can be easily fastened to the end of the backboard by releasably connecting the terminal member to the connection member. Additionally, release of the connection between the terminal member and connection member achieves easy removal of the trim cover, and further facilitates replacement of the trim cover.

In the seat according to the embodiment, a section where the trim cover is attached to the backboard becomes invisible. Consequently, the appearance is improvable.

The invention claimed is:

1. A seat, comprising:
a seat pad having a front surface and a back surface;
a backboard disposed on the back surface of the seat pad;
a trim cover covering the front surface of the seat pad;
a terminal member attached to the trim cover along an end of the trim cover; and
a connection member attached to an end of the backboard for connecting the terminal member thereto, wherein
the terminal member is connected to the connection member in a state where the terminal member and the connection member are covered with the trim cover from an outside, so that the end of the trim cover is fastened to the end of the backboard,
the connection member has a board-side engagement part which engages with the end of the backboard,
the board-side engagement part is configured to cover at least a part of the end of the backboard and keep a shape of the end,
the board-side engagement part has a board insertion groove which allows the end of the backboard to be inserted and held in the board insertion groove,
the end of the backboard has an opening which allows the board-side engagement part to be inserted in the opening, and
the end of the backboard is inserted in the board insertion groove in a state where the board-side engagement part is inserted in the opening.

2. The seat according to claim 1, wherein
the end of the trim cover is folded back to an inside of the trim cover together with the terminal member, so that the terminal member is covered with the trim cover from the outside, and
the terminal member is connected to the connection member in a state where the connection member is covered with an inner part of the trim cover and a folded-back part of the trim cover.

3. The seat according to claim 1, wherein
at least a part of the end of the trim cover has a curving shape, and
the terminal member has elasticity so as to be deformable along the curving shape.

4. The seat according to claim 1, wherein
the end of the backboard is located so as to define a step between the end of the backboard and a main body of the backboard, and
the board-side engagement part is configured to keep the shape of the end of the backboard by covering a corner defined by the end and the step of the backboard.

5. The seat according to claim 1, wherein
the board-side engagement part further includes a retainer for preventing the end of the backboard placed in the board insertion groove from coming off from the board insertion groove.

6. The seat according to claim 1, wherein
the connection member is made of a synthetic resin having elasticity so as to be engageable with and disengageable from the end of the backboard in the board-side engagement part.

7. The seat according to claim 1, wherein
the terminal member has a flat part, and
the connection member has a terminal insertion slot which allows the flat part to be inserted in the terminal insertion slot to allow the terminal member to be held in the terminal insertion slot.

8. The seat according to claim 7, wherein
the flat part is attached to the end of the trim cover, and
the terminal insertion slot has an entrance facing in such a direction as to allow the flat part to be inserted in the terminal insertion slot in a state where the end of the trim cover is folded back to the inside of the trim cover.

9. The seat according to claim 8, wherein
the terminal member further has a columnar part along an edge of the flat part, the columnar part having an outer peripheral surface in a curving shape, and keeping the shape of the end of the trim cover in a state where the outer peripheral surface is in contact with the end of the trim cover from an inside of the folded-back part at the end of the trim cover.

10. The seat according to claim 1, wherein
the terminal member and the connection member are configured to be attachable to and detachable from each other.

11. The seat according to claim 2, wherein
at least a part of the end of the trim cover has a curving shape, and
the terminal member has elasticity so as to be deformable along the curving shape.

12. The seat according to claim 4, wherein
the connection member is made of a synthetic resin having elasticity so as to be engageable with and disengageable from the end of the backboard in the board-side engagement part.

* * * * *